(12) United States Patent
Usui et al.

(10) Patent No.: US 7,805,991 B2
(45) Date of Patent: Oct. 5, 2010

(54) LIQUID SENSING APPARATUS FOR A LIQUID CONTAINER FOR SUPPLYING A LIQUID TO A LIQUID CONSUMING APPARATUS, AND A LIQUID CONTAINER IN WHICH THE LIQUID SENSING APPARATUS IS BUILT

(75) Inventors: Minoru Usui, Nagano (JP); Kazuo Koshino, Nagano (JP); Hitotoshi Kimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 47 days.

(21) Appl. No.: 12/208,600

(22) Filed: Sep. 11, 2008

(65) Prior Publication Data

US 2009/0013779 A1 Jan. 15, 2009

Related U.S. Application Data

(63) Continuation of application No. 11/274,460, filed on Nov. 15, 2005, now Pat. No. 7,424,824.

(30) Foreign Application Priority Data

Nov. 15, 2004 (JP) ............... 2004-330510
Sep. 30, 2005 (JP) ............... 2005-285813

(51) Int. Cl.
*G01F 23/28* (2006.01)
(52) U.S. Cl. .................. 73/290 V; 73/290 R
(58) Field of Classification Search .............. 73/290 V, 73/290 R
See application file for complete search history.

(56) References Cited

U.S. PATENT DOCUMENTS 4,593,292 A 6/1986 Lewis
4,604,633 A * 8/1986 Kimura et al. ................. 347/7
5,956,061 A 9/1999 Ahn
6,470,744 B1 * 10/2002 Usui et al. ................. 73/290 R (Continued)

FOREIGN PATENT DOCUMENTS

CN 1159392 A 9/1997

(Continued)

OTHER PUBLICATIONS

Extended European Search Report, dated Mar. 31, 2009, EP 05809372.

*Primary Examiner*—Hezron Williams
*Assistant Examiner*—Rodney T Frank
(74) *Attorney, Agent, or Firm*—Stroock & Stroock & Lavan LLP

(57) ABSTRACT

A liquid sensing apparatus includes a liquid sensing chamber 33 having a liquid inlet port that is in communication with an external liquid container in which a liquid is reserved, and a liquid outlet port that is in communication with a liquid consuming apparatus, a movable member 34 movable depending on a liquid level in the liquid sensing chamber 33, a recess portion 33b, 41a for cooperating with a wall surface of the movable member 34 to form a closed space when the movable member 34 is moved to a predetermined position depending the liquid level, and a piezoelectric sensing means 40 for applying a vibration to the recess portion and sensing a state of a free vibration following upon the vibration.

6 Claims, 10 Drawing Sheets

U.S. PATENT DOCUMENTS

| | | | |
|---|---|---|---|
| 6,745,626 B2 * | 6/2004 | Usui et al. | 73/290 R |
| 7,188,520 B2 | 3/2007 | Usui et al. | |
| 7,267,000 B1 | 9/2007 | Usui et al. | |
| 7,325,400 B2 | 2/2008 | Usui et al. | |
| 7,325,450 B2 | 2/2008 | Usui et al. | |
| 7,424,824 B2 * | 9/2008 | Usui et al. | 73/290 V |
| 7,434,462 B2 | 10/2008 | Usui et al. | |
| 2002/0015084 A1 | 2/2002 | Tsukada et al. | |
| 2002/0135623 A1 | 9/2002 | Tsukada et al. | |
| 2003/0071862 A1 | 4/2003 | Tsukada et al. | |
| 2004/0056910 A1 | 3/2004 | Usui et al. | |
| 2004/0135854 A1 * | 7/2004 | Kuwabara et al. | 347/85 |
| 2004/0217127 A1 * | 11/2004 | Kimura et al. | 222/92 |
| 2004/0252146 A1 * | 12/2004 | Naka et al. | 347/6 |
| 2005/0243110 A1 | 11/2005 | Takahashi et al. | |
| 2006/0007259 A1 | 1/2006 | Zhang | |

FOREIGN PATENT DOCUMENTS

| | | |
|---|---|---|
| CN | 1274646 A | 11/2000 |
| KR | 2002-0035839 | 5/2002 |
| KR | 2002-0067499 | 8/2002 |

* cited by examiner

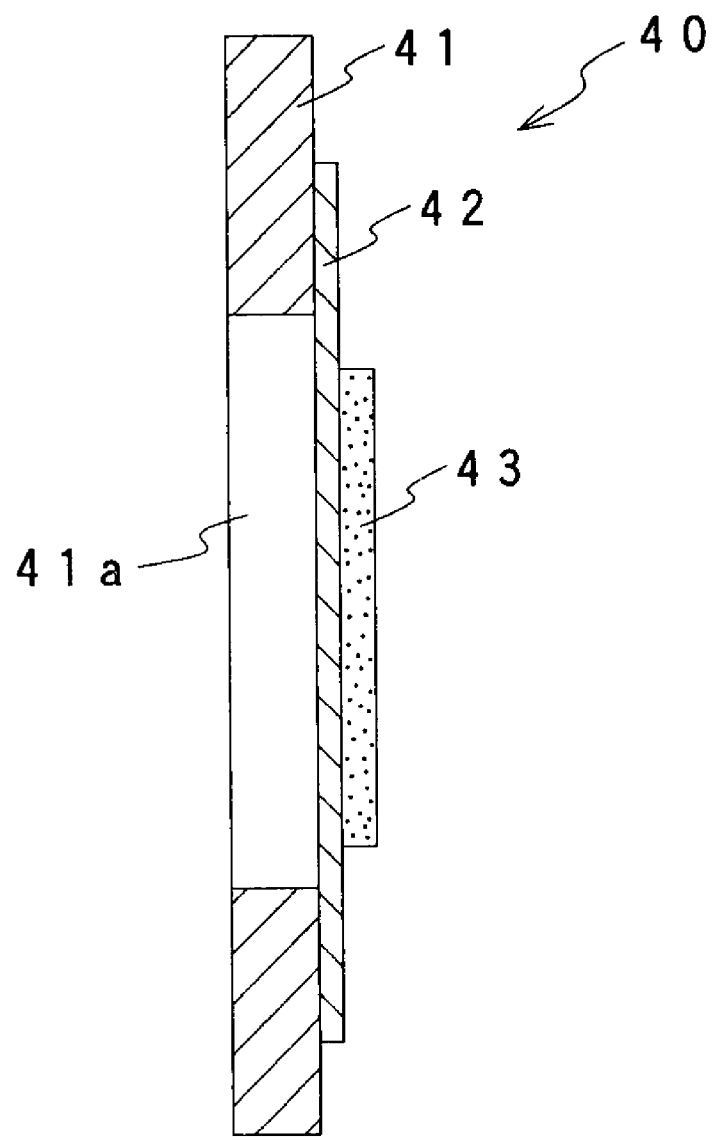

LIQUID SENSING APPARATUS FOR A LIQUID CONTAINER FOR SUPPLYING A LIQUID TO A LIQUID CONSUMING APPARATUS, AND A LIQUID CONTAINER IN WHICH THE LIQUID SENSING APPARATUS IS BUILT

CROSS-REFERENCE TO RELATED APPLICATION

This application is a continuation of copending application Ser. No. 11/274,460, filed on Nov. 15, 2005, the contents of which are incorporated by reference herein.

BACKGROUND OF THE INVENTION

The present invention relates to a liquid container for supplying a predetermined liquid to a liquid consuming apparatus, such as a liquid jet head, for jetting a minute amount of droplet, or the like and, more particularly, the technology to sense a residual amount of the liquid.

A liquid jet head of a commercial recording apparatus for super-high quality printing as well as liquid jet heads of a textile printing apparatus and a microdispenser receive a supply of a liquid from a liquid container. If the liquid jet head is operated without the supply of the liquid, the liquid jet head is damaged by the so-called blank shot. For this reason, a residual amount of the liquid in the liquid container must be monitored to prevent such damage.

Taking the recording apparatus as an example, various methods of sensing a residual ink amount in an ink cartridge serving as the liquid container have been proposed. JP-A-2001-146030 proposes that a vibration plate, to which a piezoelectric vibrator is fixed, is disposed contact the liquid. In this proposal, a frequency of a free oscillation of the vibration plate is sensed, which is changed depending on whether or not the liquid contacts the vibration plate.

However, in case where a space above the liquid is opened to communicate with the atmosphere for smooth supply of the liquid, the liquid is likely to be evaporated. Further, because the frequency is changed gradually as the liquid level in the area of the vibration plate is changed, a sensing accuracy is lowered.

JP-A-2004-136670 proposes a flexible bag containing the liquid therein and having: a liquid reservoir recess portion formed on one of opposing flat surfaces of the flexible bag; a piezoelectric vibrator disposed on an outer side of the recess portion; and a rigid body disposed on the other flat surface. In this proposal, a residual amount of the ink is sensed based on a vibration state that is changed depending on the liquid amount (a depth of the liquid) existing between the rigid body and the piezoelectric vibrator. This proposal can sense the remaining liquid amount with relatively high accuracy, but suffers from a problem in that sensing of the residual amount of the ink contained in the flexible bag is affected by deflection, crease, or the like of the flexible bag because the rigid body is moved to follow a deformation of the flexible bag,

SUMMARY OF THE INVENTION

It is an object of the present invention to provide a liquid sensing apparatus capable of accurately sensing a point of time at which a liquid level reaches a specified level.

It is another object of the present invention to provide a liquid sensing apparatus that can achieve the accurate sensing of the point of time, while suppressing evaporation of the liquid as small as possible.

Also, it is another object of the present invention to provide a liquid container having a function of sensing the state that a residual amount of the liquid reaches a specified level.

The invention in a 1st aspect includes: a liquid reservoir portion having a liquid inlet port that can communicate with an external liquid container in which a liquid is reserved, and a liquid outlet port that can communicate with a liquid consuming apparatus; a movable member movable depending on a liquid level in the liquid reservoir portion; a recess portion for cooperating with a wall surface of the liquid reservoir portion to form a closed space when the movable member is moved to a predetermined position depending on the liquid level; and a piezoelectric sensing means for applying a vibration to the recess portion and sensing a state of a free vibration following upon the vibration.

The invention in a 13th aspect includes: a liquid containing portion adapted to be pressurized by a pressurizing means to discharge a liquid therefrom; a liquid supply port that is in communication with the liquid containing portion and that can supply the liquid to an external liquid consuming apparatus; a liquid reservoir portion having a liquid inlet port that is in communication with the liquid containing portion, and a liquid outlet port that is in communication with the liquid supply port; a movable member movable depending on a liquid level in the liquid reservoir portion; a recess portion for cooperating with a wall surface of the movable member to form a closed space when movable member is moved to a predetermined position depending on the liquid level; and a piezoelectric sensing means for applying a vibration to the recess portion and sensing a state of a free vibration following upon the vibration.

The invention in 2nd and 14th aspects is arranged so that the liquid reservoir portion is formed like a cylinder and the movable member constitutes one wall surface of the liquid reservoir portion.

The invention in 3rd and 15th aspects is arranged so that the liquid reservoir portion is constructed by a cylindrical recess portion that has an opening portion on an upper side of the liquid, and a lid member that seals the opening portion and has an atmosphere communicating means for causing a space in the recess portion to communicate with an atmosphere.

The invention in 4th and 16th aspects is arranged so that the atmosphere communicating means is formed of a capillary that is in communication with an atmosphere communicating port formed in the lid member.

The invention in 5th and 17th aspects is arranged so that the atmosphere communicating means includes a film member that has an air permeability and a vapor impermeability.

The invention in 6th and 18th aspects is arranged so that the movable member constitutes a meniscus seal between the movable member and an inner surface of the liquid reservoir portion on an outer periphery, and has a wall surface having a height that can suppress an inclination of the movable member.

The invention in 7th and 19th aspects is arranged so that the movable member has a surface that is formed in a region to face to a vibration surface of the piezoelectric sensing means and that is almost parallel with the vibration surface.

The invention in 8th and 20th aspects further includes an urging means for urging the movable member in a descending direction of the liquid level.

The invention in 9th and 21st aspects is arranged so that the urging means includes an elastic member.

The invention in 10th and 22nd aspects is arranged so that the urging means is a gravity.

The invention in 11th and 23rd aspects further includes a second recess portion for cooperating with the wall surface of another wall surface of the movable member to form a closed space when the movable member is moved to a position where the liquid in the liquid container is consumed completely, and is arranged so that the piezoelectric sensing means is also provided to the second recess portion.

The invention in 12th and 24th aspects, the predetermined position is one of a first position corresponding to the liquid level at which the liquid can be supplied sufficiently to the liquid consuming apparatus, and a second position corresponding to the liquid level immediately before the supply of the liquid to the liquid consuming apparatus is stopped.

The invention in 27th aspect includes: a liquid containing portion adapted to be pressurized by a pressurizing means to discharge a liquid therefrom; a liquid supply port that is in communication with the liquid containing portion and that can supply the liquid to an external liquid consuming apparatus; a liquid reservoir portion having a liquid inlet port that is in communication with the liquid containing portion, and a liquid outlet port that is in communication with the liquid supply port; a movable member installed in the liquid reservoir portion and movable depending on an amount of contained liquid; a recess portion, formed in the liquid reservoir portion, for cooperating with one surface, which is parallel with a horizontal surface, of the movable member to form a closed space when the movable member is moved to a predetermined position depending on the amount of contained liquid; and a piezoelectric sensing means for applying a vibration to the recess portion and sensing a state of a free vibration following upon the vibration.

The invention in 28th aspect is arranged so that the liquid reservoir portion includes an opening portion formed on an upper surface and a film that seals the opening portion and that is deformable depending on the amount of contained liquid, and the piezoelectric sensing means is disposed on a bottom portion of the liquid reservoir portion.

The invention in 29th aspect is arranged so that the movable member moves following upon a deformation of the film depending on a change of the amount of contained liquid in the liquid reservoir portion.

The invention in 30th aspect is arranged so that the movable member is secured to the film.

The invention in 31st aspect is arranged so that the movable member has a surface, which is almost parallel with the vibration surface, in a region that faces to a vibration surface of the piezoelectric sensing means.

The invention in 32nd aspect further includes an urging means for urging the movable member in a direction toward the piezoelectric sensing means.

The invention in 33rd aspect is arranged so that the urging means includes an elastic member.

The invention in 34th aspect is arranged so that a point of time when the movable member cooperates with the recess portion to form the closed space is set to correspond to a state that the liquid in the liquid container is consumed fully.

The invention in 35th aspect is arranged so that a point of time when the movable member cooperates with the recess portion to form the closed space is set to correspond to a state that the liquid in the liquid container is consumed substantially.

According the invention in the 1st aspect, a vibration acting region is partitioned by the movable member and the recess portion, and it is possible to accurately sense without a point of time or a state that the liquid reaches a predetermined level. Also, the movable member acts as the lid member for the liquid reservoir portion to suppress the evaporation of the liquid as small as possible.

According the invention in the 13th aspect, a vibration acting region is partitioned by the movable member and the recess portion, and it is possible to sense surely whether or not the liquid is present in the liquid containing region, by accurately sensing a point of time or a state that the liquid reaches a predetermined level. Also, the movable member acts as the lid member for the liquid reservoir portion to suppress the evaporation of the liquid as small as possible.

According the invention in the 4th, 5th, 16th, and 17th aspects, the evaporation of the liquid can be suppressed as small as possible.

According the invention in the 6th and 18th aspects, the movable member can be moved in parallel with the liquid surface, and the liquid level can be sensed surely by sealing the recess portion at a point of time when the liquid level reaches a predetermined level.

According the invention in the 7th and 19th aspects, the recess portion can be sealed surely to change the acoustic impedance clearly between the case where the liquid is present and the case where the liquid is not present.

According the invention in the 8th and 20th aspects, the movable member is forcedly urged in the descending direction of the liquid level. Therefore, a stop of the movable member caused by a friction between the movable member and the liquid reservoir portion can be prevented, and a reduction of the liquid can be sensed accurately.

According the invention in the 11th and 23rd aspects, even when a volume of the liquid reservoir portion is expanded, a point of time when the liquid is consumed can be sensed surely by the second recess portion and the piezoelectric sensing means provided thereto.

According the invention in the 12th and 24th aspects, a time required to prepare the subsequent liquid can be ensured before the liquid in the liquid reservoir portion is discharged completely.

According the invention in the 27th aspect, an expandable member can be fixed to the movable member, the movable member is moved depending on a change of pressure, i.e., a change of an amount of contained liquid, and the ink end and the ink near-end can be sensed accurately by closing the recess portion.

According the invention in the 28th aspect, the liquid reservoir portion can be easily deformed depending on a change of the amount of contained amount (a change of the pressure), and can be constructed easily as a closed space. Thus, leakage and evaporation of the ink can be prevented easily with a simple structure in contrast to the meniscus seal.

According the invention in the 29th and 30th aspects, the movable member can be easily moved based on an easy deformation of the film constituting the expandable member to follow the liquid level or the pressure.

According the invention in the 31st aspect, a closed space whose volume is changed depending on the liquid level can be formed.

According the invention in the 32nd and 33rd aspects, a point of time when the movable member closes the recess portion can be changed by adjusting the urging force, and an inner pressure (remaining ink) to be sensed in the liquid reservoir portion can be easily set.

According the invention in the 34th and 35th aspects, the ink end sensing mechanism or the ink near-end sensing mechanism for the ink containing region can be easily realized.

The present disclosure relates to the subject matter contained in Japanese patent application Nos. 2004-330510

(filed on Nov. 15, 2004) and 2005-285813 (filed on Sep. 30, 2005), each of which is expressly incorporated herein by reference in its entirety.

BRIEF DESCRIPTION OF THE DRAWINGS

FIG. 4 is a sectional view showing an embodiment of a piezoelectric sensing means.

DESCRIPTION OF THE PREFERRED EMBODIMENT

The details of the present invention will be explained with reference to illustrated embodiments hereinafter.

Figure 1A:
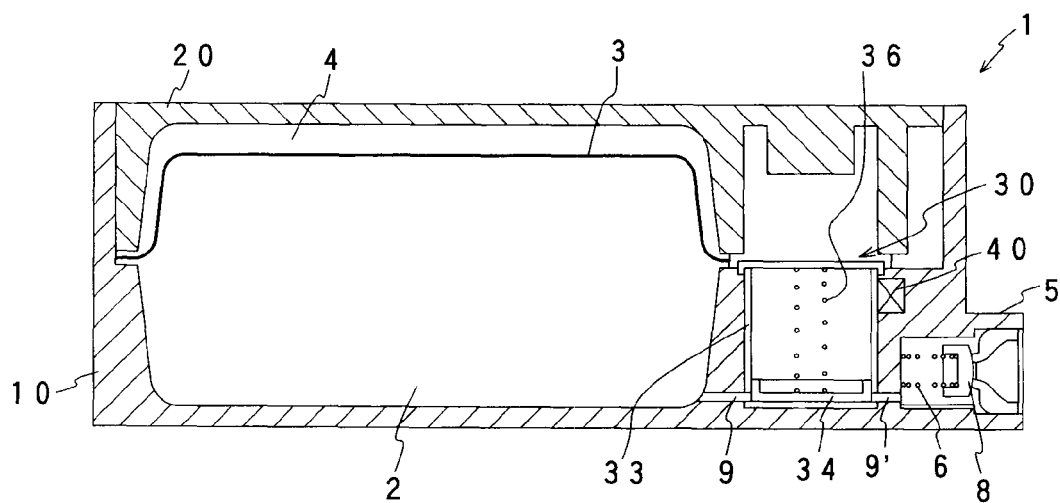
FIGS. 1A and 1B are views showing schematically a state before a liquid container is fitted into a recording apparatus serving as one type of a liquid consuming apparatus and a state that a pressure is applied to an ink after the container is fitted, respectively.
Figure 1B:
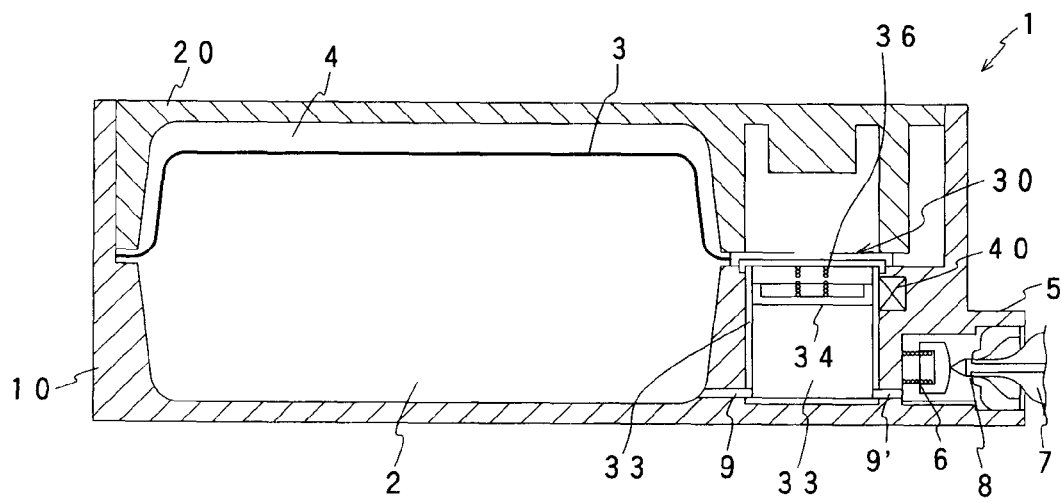

FIGS. 1A and 1B are schematic views showing an embodiment of a liquid container of the present invention, respectively, by taking an ink cartridge, which contains the ink to be supplied to an ink jet recording apparatus as a liquid consuming apparatus, as an example.

In this embodiment, a first case 10 and a second case 20, each constructed by a box member forming a semi-shell body, are combined together into a case to form a cartridge 1 serving as a liquid container. In order to form a liquid reservoir region 2 that contains the liquid such as an ink, a flexible film member 3 formed of a resin film, or the like is welded to a periphery of the first case 10 by the thermal welding, or the like and sealingly covers an opening portion formed in the first case 10. Also, a periphery of the second case 20 is pressure-contacted with the thermally welded portion of the flexible film member 3 on the other side of the flexible film member 3 such that a space formed between the second case and the flexible film member constitutes an airtight space. This airtight space acts as a pressure application region 4 that applies a pressure to the flexible film member 3 by a pressurized fluid (pressurized air) to discharge the liquid from the first case to the outside. The pressurized fluid is introduced from a pressurized fluid introduction port (not shown) from the outside into the pressure application region 4.

Also, a liquid supply port 5 to be connected to a liquid supply port of the liquid consuming apparatus is formed on an outer surface of the first case 10. A packing having an opening that contacts elastically an outer periphery of a liquid introducing member (liquid introducing needle) 7 that communicates with a liquid jet head of the liquid consuming apparatus, a valve member 8 that contact an upper surface (an left end surface in FIG. 1A) of the packing to seal the opening of the packing, and a spring 6 such as a coil spring to push the valve member 8 against the packing are incorporated into the liquid supply port 5.

The valve member 8 is kept in its normally close state by the spring 6 when the ink cartridge 1 is not connected to the liquid consuming apparatus (FIG. 1A), while the valve member 8 is pushed by the liquid introducing member 7 in the valve opening direction and kept in its open state when the ink cartridge 1 is connected to the liquid consuming apparatus (FIG. 1B).

The liquid supply port 5 is in fluid communication with the liquid reservoir region 2 via connection flow paths 9, 9'. A liquid sensing means 30, which is a feature of the present invention, is provided between the connection flow paths 9, 9'. That is, the liquid sensing means 30 is connected to a portion of an ink flow passage by which the liquid reservoir region communicates with the ink supply port.

Figure 2A:
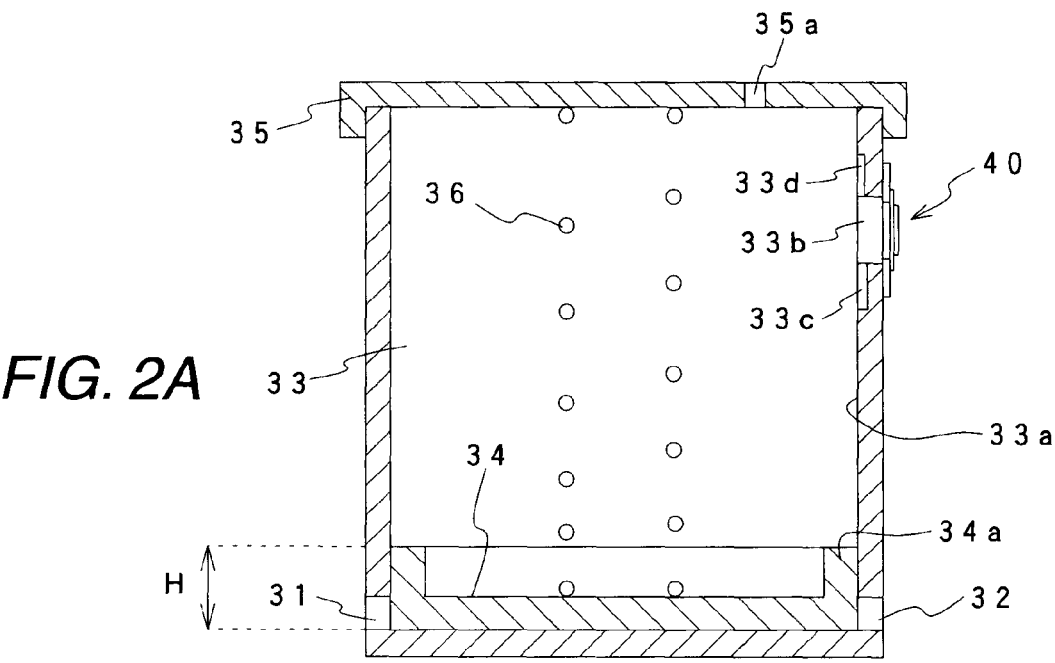
FIGS. 2A, 2B and 2C are views showing a configuration of a sensor in a state that the liquid is not filled in a liquid sensing chamber, a state that the liquid is filled up to a specified liquid level, and a state that the liquid level reaches a level that is slightly lower than the specified liquid level position, respectively.

FIG. 2 shows an embodiment of the liquid sensing means 30. This liquid sensing means includes: a liquid sensing chamber 33 made of a cylindrical vessel having an opening 31 and an opening 32 that are provided to a bottom area and respectively connected to the liquid reservoir region 2 and the liquid supply port 5 in a state that the cartridge is connected to the liquid consuming apparatus; a movable member 34 that moves along an inner surface 33a of the liquid sensing chamber 33 in response to a change of the liquid level and that also acts as one wall of the liquid sensing chamber 33; a lid member 35 that seals the opening portion of the liquid sensing chamber 33 and that also has an atmosphere communication path 35a to communicate an upper portion of the liquid sensing chamber 33, i.e., the air space region, with the atmosphere; a compression spring 36 serving as an urging means provided between the lid member 35 and the movable member 34 to preferably push the movable member 34 downward by a weak force; and a piezoelectric sensing means 40 having a piezoelectric element provided to sense a specified liquid level.

Figure 3A:
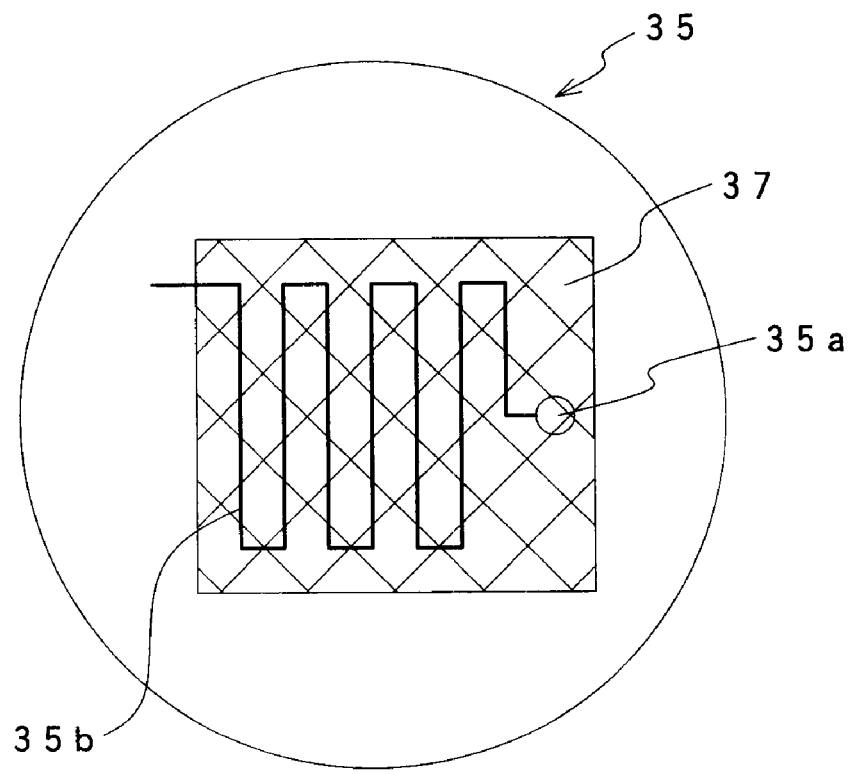
FIGS. 3A and 3B are a plan view and a sectional view showing an embodiment of a lid member, respectively.
Figure 3B:
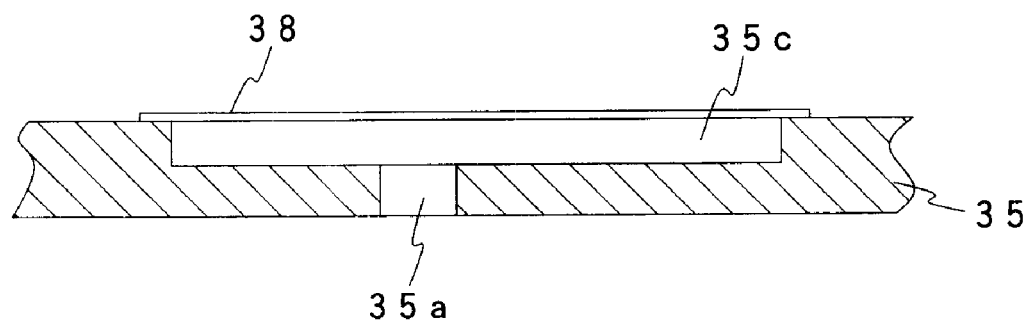

As shown in FIG. 3A, the atmosphere communication path 35a is released to the atmosphere via a capillary that is constructed by sealing a narrow groove 35b with an air impermeable film 37 not to cover one end thereof. This narrow groove 35b is formed on a surface (or a back surface) of the lid member 35 in a circuitous (meandering) manner such that the other end thereof communicates with the atmosphere communication path 35a. Alternately, as shown in FIG. 3B, a recess portion 35c communicating with the atmosphere communication path 35a is formed on the surface side of the lid member 35, and the recess portion 35c is sealed with a film 38, which can block penetration of the evaporation of the liquid but penetrate the air, such that the recess portion 35c is in air communication with the atmosphere via the film 38. This way, the air communication of the liquid sensing chamber 33 with the atmosphere can be achieved while suppressing evaporation of the liquid from the liquid sensing chamber 33.

The movable member 34 is formed in size to such extent that the movable member can cover an overall surface of the liquid. Also, a clearance between the movable member 34 and the liquid sensing chamber 33 is set to such an extent that the movable member 34 can easily follow the liquid level not to cause a liquid leakage, more particularly, to such an extent that a meniscus seal can be formed.

Also, a vertical wall surface 34a with a height H is provided to an outer periphery of the movable member 34. This height H is set to such a level that permits the movable member 34 to function as a piston, i.e., permits the movable member 34 to keep its posture perpendicular to the inner surface 33a.

Also, a spring force of the compression spring 36 constituting the urging means is set to such an extent that a liquid leakage is not generated from the clearance between the inner surface 33a of the liquid sensing chamber 33 and the vertical wall surface 34a of the movable member 34, i.e., the movable member 34 is not buried in the liquid by an urging force of the urging means.

In this case, a gravity applied to the movable member 34 as well as an elastic member such as a rubber, a plate spring, or the like can be utilized as the urging means.

The piezoelectric sensing means 40 is fixed to a recess portion 33b on an outer surface of the liquid sensing chamber 33 to seal this recess portion 33b. This recess portion 33b is formed at a predetermined position of a wall surface constituting the liquid sensing chamber 33, that is, at the location to which the movable member 34 faces when the liquid level reaches a predetermined level to be sensed.

As shown in FIG. 4, the piezoelectric sensing means 40 includes: a fitting base member 41 having a through hole 41a that passes through a center area thereof, and that acts as an entering path for the liquid; a vibration plate 42 that is fixed to the base member 41 to seal the through hole 41a and to permit its free oscillation or vibration; and a piezoelectric element 43 fixed to a surface of the vibration plate 42.

Figure 5A:
FIGS. 5A, 5B and 5C are views showing a state that a piezoelectric element is excited, an output signal of the piezoelectric element in a state that a movable member does not face to a sensor, and an output condition of the piezoelectric element in a state that the movable member faces to the sensor, respectively.

When a charge/discharge waveform shown in FIG. 5A is applied to the piezoelectric element 43 of the piezoelectric sensing means 40 constructed in this manner, a vibration system constructed by the vibration plate 42, the piezoelectric element 43, and the liquid or the air can be vibrated freely. Since this free vibration (the residual vibration) generates a back electromotive force in the piezoelectric element 43 by the piezoelectric effect, a vibration period can be measured by measuring a period of this back electromotive force.

Next, the embodiment constructed in this fashion will be explained while taking the case where this embodiment is used as the ink cartridge as an example hereunder. When the ink cartridge is fitted to the recording apparatus serving as the liquid consuming apparatus, the liquid introducing member 7 is engaged with the liquid supply port 5 to move the valve member 8 back, as shown in FIG. 1B, and also a pressurized fluid supply source (not shown) communicates with the pressure application region 4 (In this case, it is desired that the pressure application region 4 should be constructed such that the pressure application region 4 can be guided to the surface, on which the liquid supply port 5 is formed, by a flow path, and can be connected to the pressurized fluid supply source when the ink cartridge is fitted to the liquid consuming apparatus).

The movable member 34 is positioned at the bottom portion of the liquid sensing chamber 33 by the urging force of the compression spring 36 (FIG. 2A) in a state that the air as the pressurized fluid is not supplied to the pressure application region 4. When a drive signal is supplied to the piezoelectric element 43 in this state, the piezoelectric element 34 is excited as an actuator in a predetermined time and then the vibration plate 42 starts the free vibration (FIG. 5A).

When the drive signal supplied to the piezoelectric element 43 is stopped at a point of time when the excitation is completed, the piezoelectric element 43 generates a back electromotive force corresponding to the free vibration of the vibration plate 42. Since the liquid is not present in the recess portions 33b, 41b in this state, the vibration plate 42 is exposed to the air. Hence, the vibration plate 42 starts the free vibration at a relatively high frequency (in contrast to the case where the vibration plate contacts the liquid) decided by the vibration plate 42 and the air, and a signal that matches with a frequency and an amplitude of the free vibration is output from the piezoelectric element 43.

Then, when the air is supplied from the pressurized fluid supply source in the above state, such air flows into the pressure application region 4 formed by the flexible film member 3 and the second case 20, so that the liquid reservoir region 2 is pressurized by the flexible film member 3.

Figure 2B:
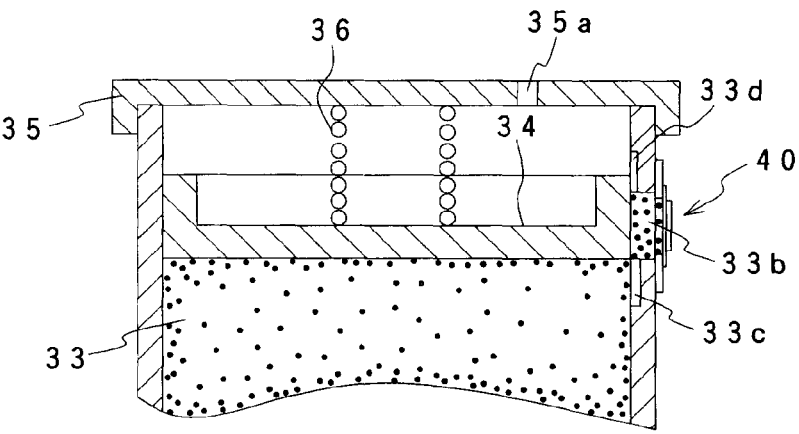
Figure 2C:
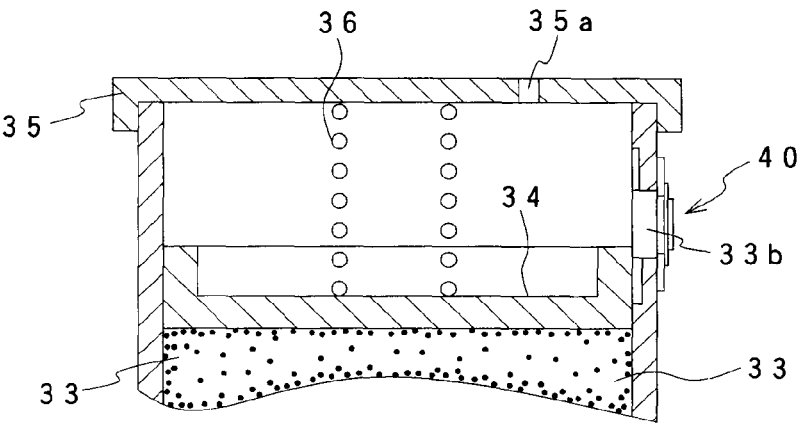

Accordingly, the ink in the liquid reservoir region 2 flows into the liquid sensing chamber 33 through the connection flow path 9, and the movable member 34 in the liquid sensing chamber 33 rises in response to a rise of the liquid level while discharging the air in the upper area via the capillary constructed by the narrow groove 35b and the air impermeable film 37. Thus, the movable member 34 faces to the recess portion 33b on which the piezoelectric sensing means 40 is positioned (FIG. 1B, FIG. 2B).

The ink to which the pressure is applied in this process flows into the recess portions 33b, 41a based on the capillary phenomenon, or the like. Therefore, the movable member 34 faces to the vibration plate 42 to put the ink filled in the recess portions 33b, 41a between them.

In this case, it is desired to form narrow grooves 33c, 33d on an inner peripheral surface of the liquid sensing chamber 33 to extend vertically, and to communicate with the recess portion 33b vertically. Such narrow grooves 33c, 33d facilitate the entry of the ink into the recess portions 33b, 41a.

It is needless to say that, even when the liquid level rises to exceed a specified position, i.e., rises higher than the recess portion 33b, the liquid can enter into the recess portion 33b and also the recess portions 33b, 41a can be sealed with the movable member 34 in a state that such recess portions 33b, 41a are filled with the liquid, so that an acoustic impedance is increased.

Figure 5B:
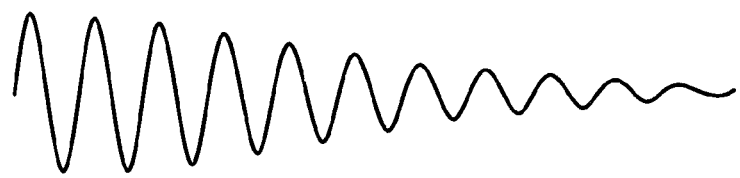
Figure 5C:
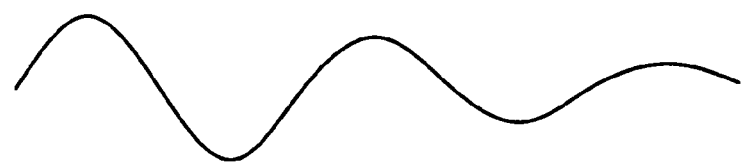
Figure 6:
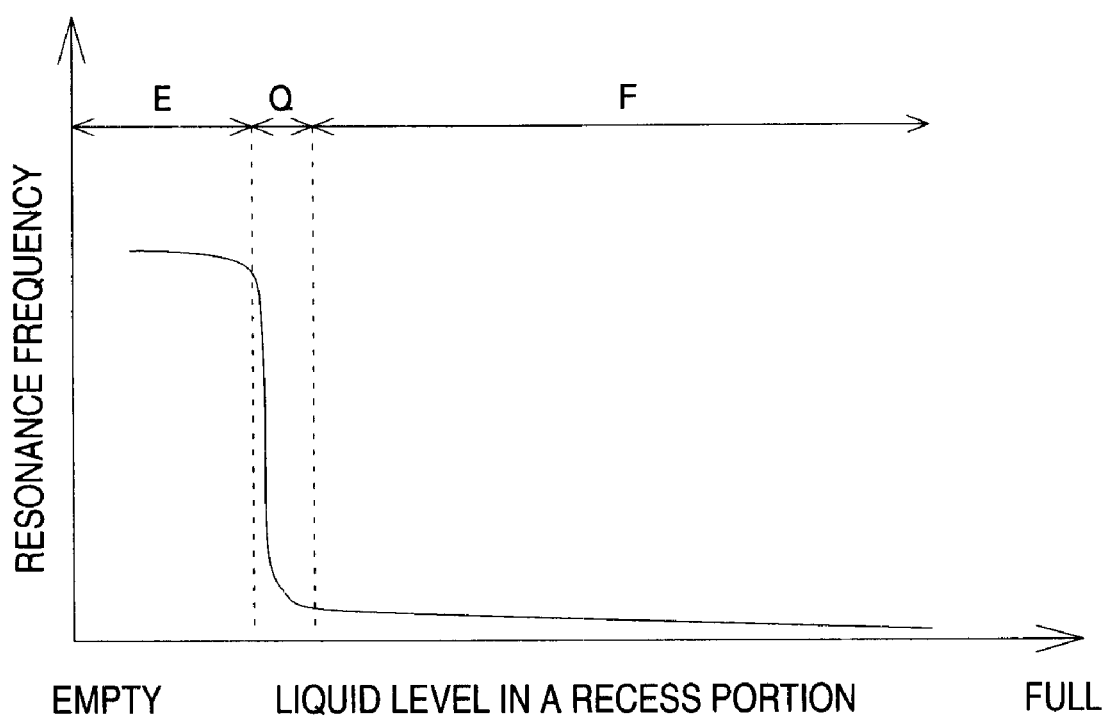
FIG. 6 is a diagram showing a relationship between a liquid level in a liquid sensing chamber and a frequency sensed by a piezoelectric sensing means.

A frequency of the free vibration of the vibration plate 42 is lowered by an increase of the acoustic impedance in comparison to the case where the vibration plate 42 is exposed to the air (FIG. 5C, a region F in FIG. 6). Since the free vibration of the vibration plate 42 can be sensed as a frequency of a back electromotive force generated in the piezoelectric element 43, it can be sensed that the liquid level reaches a predetermined level, i.e., the recess portions 33b.

The ink is going to evaporate through a minute clearance between a periphery of the movable member 34 and an inner surface of the liquid sensing chamber 33 while the ink is consumed by the liquid consuming apparatus in a state that a predetermined amount of ink is being supplied to the liquid sensing chamber 33. In this event, since the upper space of the movable member 34 is in air communication with the atmosphere via the capillary that is constructed by the narrow groove 35b of the lid member 35 and the air impermeable film 37, evaporation of the ink vapor can be suppressed as small as possible.

In the case where the ink in the liquid reservoir region 2 is extremely reduced with the progress of the consumption of the ink, the ink never flows into the liquid sensing chamber 33 even when the pressurized air is supplied from the pressurized fluid supply source. As a result, the ink in the liquid sensing chamber 33 cannot be maintained at a predetermined liquid level, and then the liquid level starts to gradually lower.

When the liquid level in the liquid sensing chamber 33 is lowered below the sensing area, the movable member 34 follows the liquid level and moves lower than the sensing area of the piezoelectric sensing means 40. Also, the ink in the recess portions 33b, 41a drops down in the flow path of the groove 33b. Therefore, the air starts to flow into the recess portions 33b, 41a and the frequency of the free vibration of the vibration plate 42 is changed transitionally (a region Q in FIG. 6). The vibration plate 42 is exposed to the air (FIG. 2C) in the state that the movable member 34 moved lower than the recess portion 33b.

As a result, the frequency of the vibration plate 42 is increased and subsequently an almost constant frequency is kept irrespective of the downward movement of the movable member 34 (FIG. 5B, a region E in FIG. 6). Therefore, by sensing a point of time when the frequency is changed suddenly, it is possible to sense a state in which the ink in the liquid reservoir region 2 is consumed fully or a state in which the supply of the pressurized air from the pressurized fluid supply source is stopped.

Figure 7A:
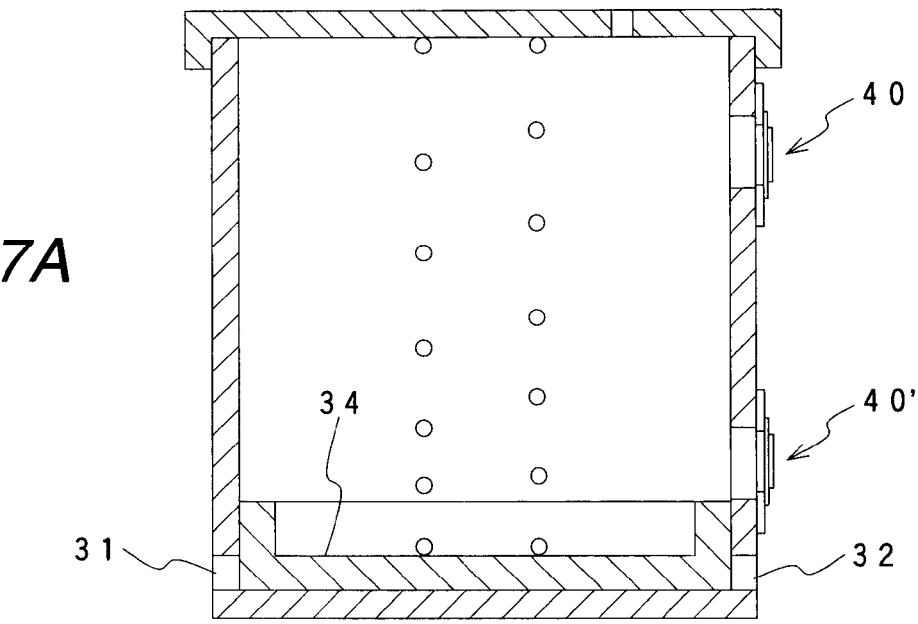
FIGS. 7A and 7B are a sectional view showing embodiments, each having the piezoelectric sensing means arranged in a different manner, respectively.

In the above embodiment, the piezoelectric sensing means 40 is arranged to face to the side surface of the movable member 34. In this case, as shown in FIG. 7A, the piezoelectric sensing means 40 may be arranged at upper and lower locations of the liquid sensing chamber 33 respectively, that is, a second piezoelectric sensing means 40' may be arranged in the position corresponding to the liquid level obtained when the minimum liquid required to prepare the next cartridge is left in the liquid sensing chamber 33, in addition to the liquid level obtained when the liquid is filled sufficiently in the liquid sensing chamber 33.

According to this embodiment, it can be sensed by the first piezoelectric sensing means 40 as described above that the liquid is filled up to the specified position. Also, if a near-end state is sensed by the second piezoelectric sensing means 40', a time required to prepare the next ink container can be ensured.

In this case, the first piezoelectric sensing means 40 may be used to sense the near end, and the second piezoelectric sensing means 40' may be used to sense the ink end.

Figure 7B:
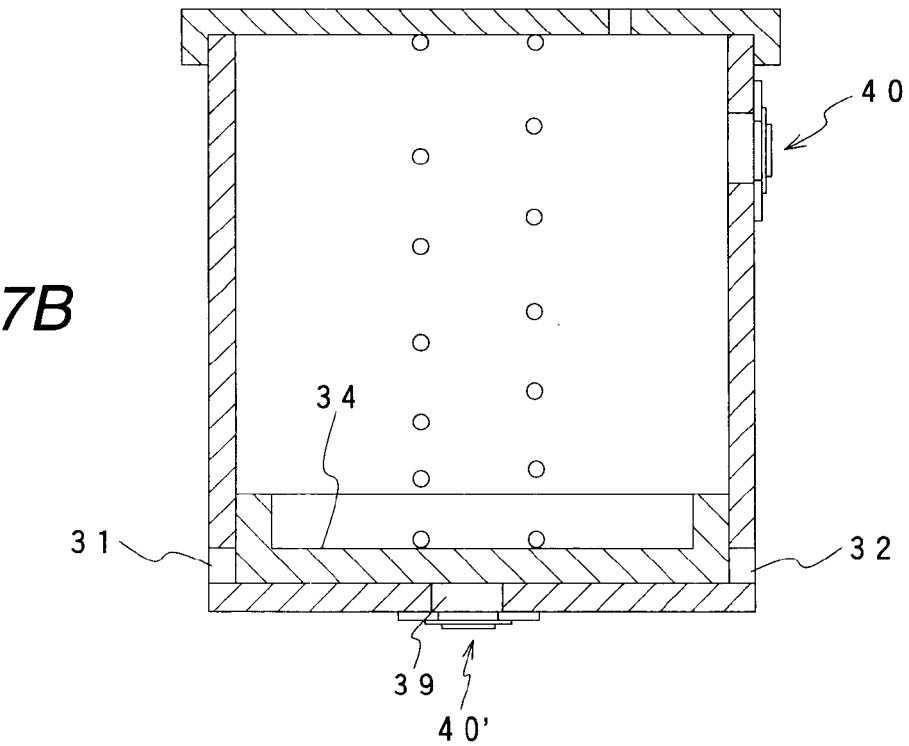

Also, as shown in FIG. 7B, if a third piezoelectric sensing means 40" is provided to a recess portion 39 formed on the bottom of the liquid sensing chamber 33, it is possible to sense the state where the movable member 34 is positioned on the bottom of the liquid sensing chamber 33, i.e., the state where the liquid cannot be supplied completely. In this embodiment, the ink always exists in the recess portion 39. Even though the recess portion 39 is filled with the ink, the acoustic impedance becomes different between a state that this recess portion 39 is sealed by the movable member 34 (in this case, a horizontal surface of the movable member acts as the wall surface) and a state that the movable member 34 is moved away from the bottom and the recess portion 39 is opened. Therefore, it is possible to sense these two states.

FIG. 8 shows another embodiment of the liquid sensing chamber 33. In this embodiment, there is provided a structure that is suited to sense a point of time when the liquid in the liquid reservoir region 2 is consumed completely, i.e., a point of time when the ink end occurs, or a point of time when the supply of the liquid cannot be substantially attained, i.e., a point of time when the ink near end occurs.

In this embodiment, like the above embodiment, the liquid sensing chamber 33 is formed as the liquid reservoir portion having the connection flow path 9 that is in fluid communication with the liquid reservoir region 2 of the cartridge 1 in the non-pressurized region, and the connection flow path 9' that is in fluid communication with the liquid supply port 5. A movable member 34' is installed in this liquid reservoir portion to move in response to an amount of liquid contained therein.

Also, the recess portion 39' is formed on the bottom portion of the liquid reservoir portion, i.e., in the position opposing to a flat surface 34'a of the movable member 34'. This recess portion 39' cooperates with the flat surface 34'a of the movable member 34' to form a closed space.

The piezoelectric sensing means 40 is provided to the recess portion 39' to apply a forced vibration to the space region of the recess portion 39' and to sense a state of the free vibration, i.e., a frequency, an amplitude, a phase, etc. generated after the forced vibration is stopped. The recess portion 39', the movable member 34', and the piezoelectric sensing means 40 constitute a liquid sensing apparatus.

In this embodiment, the liquid sensing chamber 33 is realized by forming a liquid-tight space as the liquid reservoir portion without the use of the meniscus seal, which is provided between the side surface of the movable member 34 and the peripheral surface of the liquid sensing chamber 33 in the former embodiment. In this embodiment, the liquid-tight space is formed by sealing the opening surface of the liquid sensing chamber 33 with a bag-like or cylinder-like extendable member 55. This extendable member 55 has such a flexibility that does not disturb the movement of the movable member 34' and is made of an easily extendable or telescopic film. Preferably, the film has a laminated structure of a thermally weldable layer and an air shield layer.

In other words, a top portion (a periphery) of the bag-like or cylinder-like extendable member 55 is bonded to the opening surface 33a of the liquid sensing chamber 33, for example, such that the thermally welded layer of the top portion (the periphery) of the extendable member 55 is contacted with and thermally welded to the opening surface 33a of the liquid sensing chamber 33.

Figure 8A:
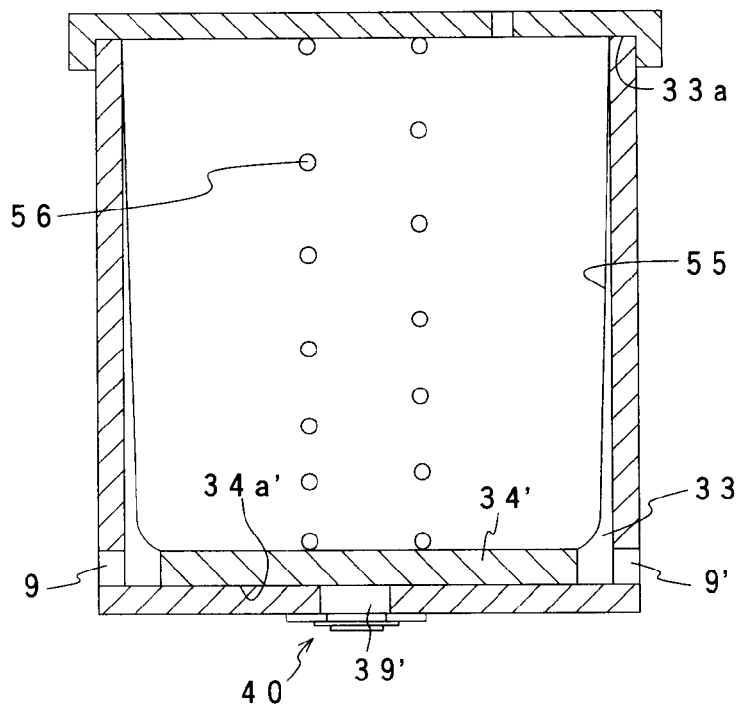
FIGS. 8A, 8B and 8C are sectional views showing yet another embodiment of the liquid sensing chamber of the present invention.
Figure 8B:
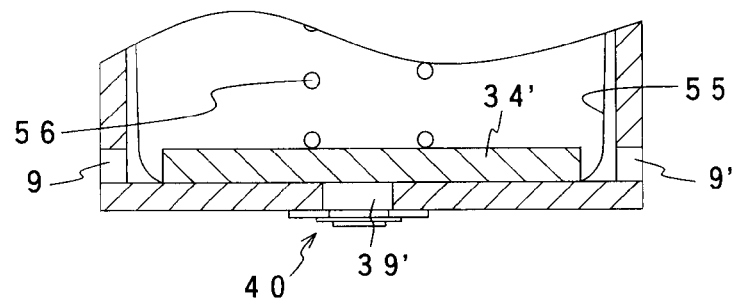
Figure 8C:
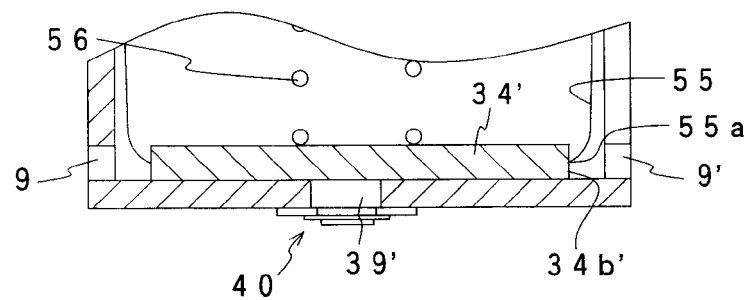

In case the extendable member 55 is formed like the bag, the movable member 34' is secured to a surface or a back surface of a bottom portion (a central portion) of the extendable member 55 such that the flat surface 34'a is opposed to the recess portion 39', as shown in FIGS. 8A and 8B. Also, in case the extendable member 55 is formed like the cylinder, a lower opening portion 55a is secured to a peripheral surface 34'b of the movable member 34', as shown in FIG. 8C.

Now, in case a moving distance of the movable member 34' may be suppressed small, the extendable member 55 may be formed of a flat flexible film, not molded into a bag-like or cylinder-like shape. In case the movable member 34' is formed of a thermally weldable polymer material, the movable member 34' can be fixed to the extendable member 55 such that the movable member 34' is contacted with and thermally welded to the thermally weldable layer of the extendable member 55.

Normally the liquid sensing chamber 33 is formed of polypropylene or polyethylene by using the injection molding. Therefore, if at least the surface of the extendable member 55 contacting the liquid sensing chamber 33 is formed of polypropylene or polyethylene that is the same material, both the liquid sensing chamber 33 and the extendable member 55 can be thermally welded easily and securely. Also, if the creases or foldable portions are preferably formed on the cylinder portion of the extendable member 55, such extendable member 55 can be easily expanded/contracted like a diaphragm or a bellow to follow the liquid level, i.e., the movement of the movable member 34', while keeping its specified shape.

Similarly to the former embodiment, a compression coil spring 56 is disposed such that one end thereof is fixed to the lid member and the other end thereof is brought into contact with the upper surface of the movable member 34', i.e., the surface of the movable member 34' opposite from the liquid contacting surface. The compression coil spring 56 elastically urges the movable member 34' toward the recess portion 39', while keeping the movable member 34' its horizontal state.

The load of the coil spring 56 pressurizes not only the liquid in the liquid sensing chamber 33 but also the liquid in the liquid reservoir region 2 that is in communication with the liquid sensing chamber 33 via the connection flow path 9. Therefore, an amount of displacement of the movable member 34' is affected by an amount of liquid in the liquid reservoir region 2 and the urging load of the coil spring 56.

Therefore, by appropriately selecting the urging load of the coil spring 56, a point of time when the recess portion 39' is closed by the movable member 34' can be set selectively in a state that the liquid in the liquid reservoir region 2 is completely lost or a state that a minute amount of the liquid is still left.

That is, the liquid sensing apparatus functions as an ink end sensing means when the former state is to be sensed, and the liquid sensing apparatus functions as an ink near-end sensing means when the latter state is to be sensed.

Figure 9:
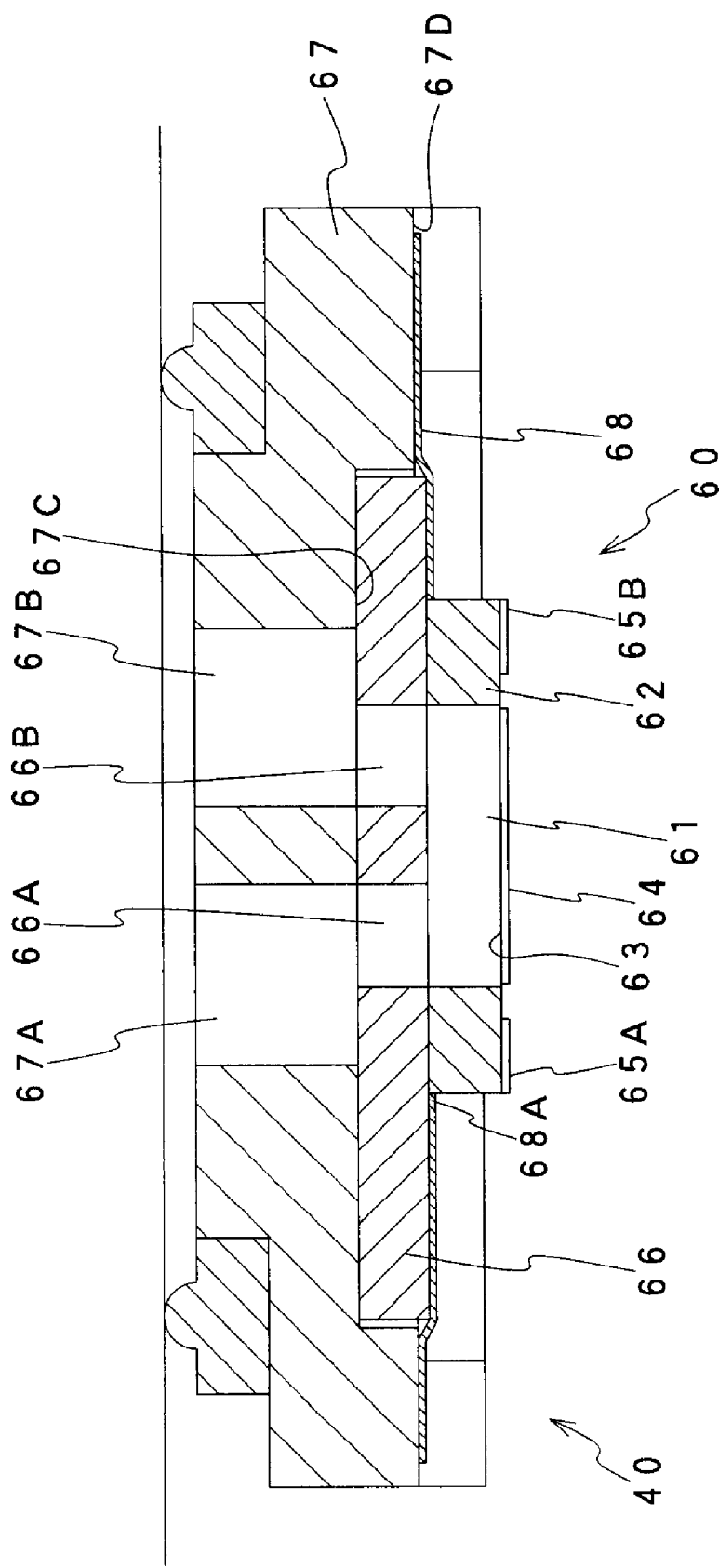
FIG. 9 is a sectional view showing another embodiment of the piezoelectric sensing means that is suitable for the liquid sensing chamber.

FIG. 9 shows an embodiment of the piezoelectric sensing means 40. A sensor chip 60 constituting this piezoelectric sensing means includes: a chip main body 62 made of ceramics and having a sensor cavity 61 formed as a circular opening in its center portion; a vibration plate 63 stacked or laminated on an upper surface of the chip main body 62 to constitute a bottom wall of the sensor cavity 61; a piezoelectric element 64 stacked or laminated on the vibration plate 63; and terminals 65A, 65B stacked or laminated on the chip main body 62.

The piezoelectric element 64 includes: upper and lower electrode layers connected to the terminals 65A, 65B respectively; and a piezoelectric layer interposed between and laminated on the upper and lower electrode layers. For example, the piezoelectric element 64 decides whether or not the liquid is confined in the sensor cavity 61, based on a change of the electrical characteristics of the piezoelectric element 64 caused dependent on the presence of the liquid in the sensor cavity 61.

The sensor chip 60 is fixed such that a lower surface of the chip main body 62 is adhered to a center portion of an upper surface of a sensor base 66 via an adhesive layer. A space between the sensor base 66 and the sensor chip 60 is sealed by the adhesive layer.

Inlet flow paths 66A, 67A and outlet flow paths 66B, 67B of the sensor base 66 and a unit base 67 are in communication with the sensor cavity 61 of the sensor chip 60. Accordingly, the ink is fed to the sensor cavity 61 via the inlet flow paths 66A, 67A, and then discharged from the sensor cavity 61 via the outlet flow paths 66B, 67B.

The metallic sensor base 66 mounting the sensor chip 60 thereon is installed into a recess portion 67C formed in the unit base 67. The sensor base 66 and the unit base 67 are covered with an adhesive film 68 made of resin and are secured together.

The adhesive film 68 has an opening 68A in a central portion thereof, and is put on the sensor base 66 and the unit base 67 in a state that the sensor base 66 is fitted to the recess portion 67C formed on the upper surface of the unit base 67, to thereby expose. the sensor chip 60 from the center opening 68A.

The inner peripheral side of the adhesive film 68 is adhered onto the upper surface of the sensor base 66 via the adhesive layer, and also the outer peripheral side thereof is adhered onto an upper wall 67D around the recess portion 67C of the unit base 67. Thus, the sensor base 66 and the unit base 67 are secured to each other and sealed.

Figure 10:
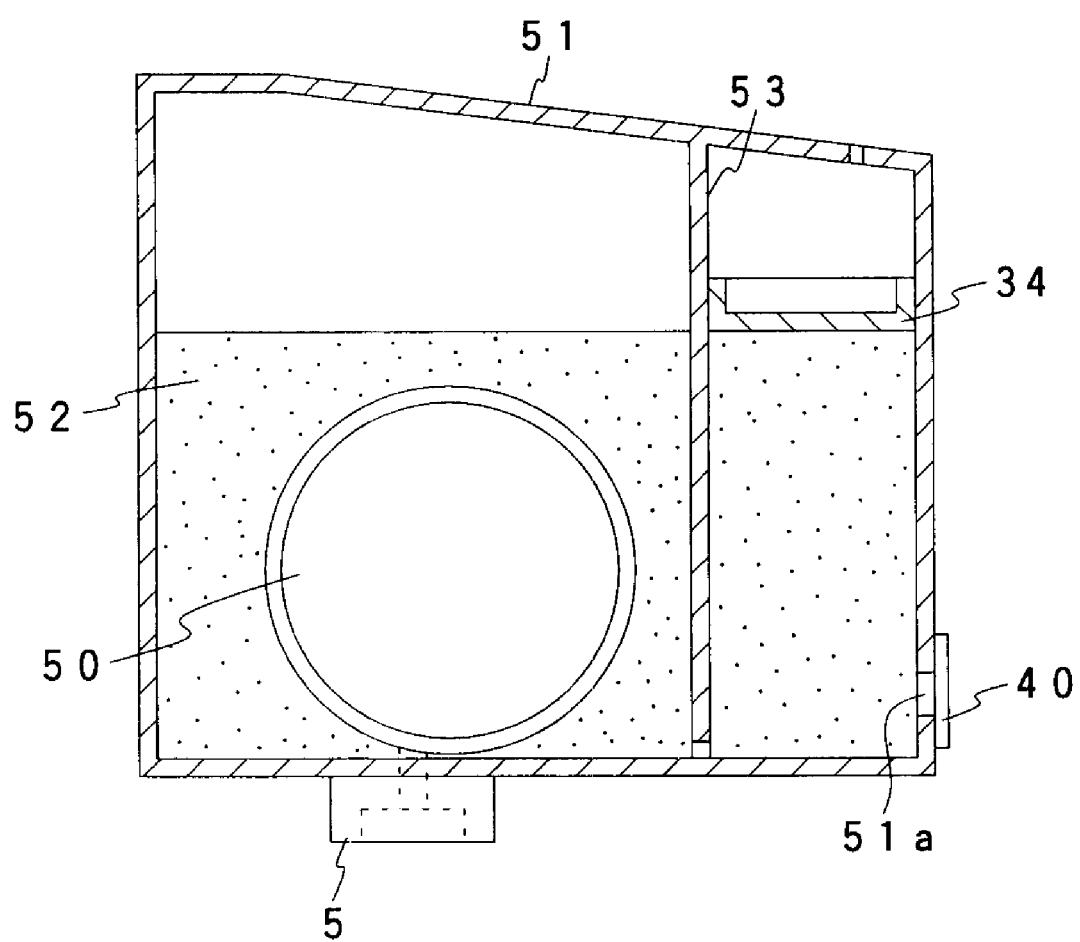
FIG. 10 is a sectional view showing another application of the present invention.

In the above embodiments, a mode in which the liquid reservoir region 2 and the liquid sensing chamber 33 are arranged independently and are connected to each other via the flow path 9 is explained. As shown in FIG. 10, the movable member 34 may be installed in a liquid container 51 having a negative pressure generating means 50 that opens a valve by a differential pressure at a point of time when a suction pressure is applied to the liquid supply port 5, and the piezoelectric sensing means 40 may be disposed on the liquid container 51 such that a through hole 51a is formed on a wall surface of the liquid container 51, and sealingly closed by the piezoelectric sensing means 40. With this arrangement, it is possible to sense a point of time when a liquid 52 is reduced to the position where the piezoelectric sensing means 40 is disposed.

In this case, it is desired that a vertical wall 53 having a communication hole 53a is provided to define a region where the movable member 34 is installed, and to restrict the movable member 34 in this region with the clearance that can form the meniscus seal on the side of the piezoelectric sensing means 40.

In the above embodiment, the movable member 34 is restricted on the side of the piezoelectric sensing means 40 by the use of the vertical wall 53. In order to restrict the movable member 34 by an inner wall of the liquid container 51 without the use of the vertical wall 53, a notched portion or a through hole may be formed through the movable member 34 so that the negative pressure generating means 50 can pass through the notched portion or the through hole of the movable member 34 when the movable member 34 is moved downward.

A liquid container according to a preferable construction will be discussed hereafter. Note that the preferable construction is one example embodying the present invention, and therefore the present invention should not be restricted thereto or thereby.

The liquid container preferably includes a first reservoir chamber (such as a liquid reservoir region 2) which is located within a container body of the liquid container and which is at least in part defined by a first flexible member (such as a flexible film member 3). In an illustrative, none-limiting embodiment as shown, for example, in FIG. 1A, the first reservoir chamber (2) is defined by the first flexible member (3) and a part (such as a first case 20) of the container body, that is, the first reservoir chamber is in part defined by the first flexible member (3). Alternatively, the first reservoir chamber may be defined entirely by the first flexible member in such a manner that a so-called ink pack or ink bag having the first reservoir chamber therein is located within the container body. Various publications disclosing a general construction of such an ink pack or ink bag are available, and therefore the detailed discussion of the ink pack or ink bag is omitted here. One example of the publications is US 2004-0217127-A1, the disclosure of which is incorporated herein by reference in its entirety. When the ink pack disclosed in US 2004-0217127-A1 is employed in the present invention, it is preferably to omit a valve body (58,113, 147,169,192) of a check valve to enable return flow of liquid to the first reservoir chamber. In case the valve body of the check valve is not omitted, the first reservoir chamber does not contract by the function of the check valve even if the pressure applied to the first reservoir chamber is released. Therefore, an expanded state of a second reservoir chamber is maintained until the liquid in the first reservoir chamber is consumed to a predetermined amount or less. Thereafter, the second reservoir chamber gradually constructed depending on consumption of liquid. Accordingly, even if the valve body of the check valve is not omitted, the end of liquid or the near end of the liquid can be sensed.

The liquid container preferably includes a second reservoir chamber (such as a liquid sensing chamber or a liquid reservoir portion 33) which is located within the container body, which is at least in part defined by a second flexible member (such as an extendable member 55) and a wall (such as a bottom portion) of the container, and which is in fluid communication with the first reservoir chamber through a first flow path (such as a connection flow path 9). Although the first reservoir chamber, the second reservoir chamber and the first flow path are provided in the same container body in the preferable construction, the present invention should not be restricted thereto or thereby. That is, for example, the container body may be divided into two members, one member housing the first reservoir chamber, and the other member housing the second reservoir chamber. Further, the first reservoir chamber and the second reservoir chamber respectively located within the discrete two members may be in fluid communication with each other through communication means such as an tube serving as a flow path without coupling the discrete two members together. In addition, only the second flexible member and the wall of the container may define the second reservoir chamber, or another wall of the container, and/or any other member may be additionally used to define the second reservoir chamber in cooperation with the second flexible member and the wall of the container.

Similarly, although the second reservoir chamber, a liquid delivery port (such as an ink supply port 5), and a second flow path (such as a connection flow path 9') through which the second reservoir chamber is in fluid communication with the liquid delivery port are provided in the same container body in the preferable construction, the second reservoir chamber and the liquid delivery port are respectively provided in discrete members and the second reservoir chamber and the liquid delivery port may be in fluid communication with each other through a tube serving as a flow path.

The liquid container preferably includes a piezoelectric sensor (such as piezoelectric sensing means 40) attached to the wall of the container to form a cavity in fluid communication with the second reservoir chamber. Although two examples of the piezoelectric sensor have been discussed in detail with reference to FIG. 4 and FIG. 9 in the present application, the present invention should not be restricted thereto and thereby, and the present invention can employ various constructions of piezoelectric sensor. Other examples of the piezoelectric sensor, which can be used in the present invention, are discussed in detail in US 2005-0243110-A1, the disclosure of which is incorporated therein by reference in its entity. In US 2005-0243110-A1, the most of the embodiments are directed to a piezoelectric sensor arranged such that a cavity of the piezoelectric sensor is in fluid communication with an upstream side liquid chamber through a flow passage and with a downstream side liquid chamber through another flow passage. In case the piezoelectric sensor discussed in US 2005-0243110-A1 is employed in the present invention, the piezoelectric sensor is attached to the container body such that the cavity of the piezoelectric sensor is in fluid communication with the same second reservoir chamber.

The liquid container preferably includes a movable member (such as a movable member 34') which is attached to the second flexible member and which is movable toward and away from the wall of the container. The movable member is arranged to contact the wall of the container (as shown, for example, in FIG. 8C) when the second reservoir chamber contracts, to thereby block the fluid communication between the cavity and the second reservoir chamber. Consequently, a closed space containing liquid therein but isolated from liquid in the second reservoir chamber is formed, causing a change in acoustic impedance, which can be sensed by the piezoelectric sensor.

The liquid container preferably includes an urging member (such as a compression spring 36, 56) that urges the movable member to contact the wall of the container.

In the liquid container, the second reservoir chamber expands to cause the second flexible member to move the movable member away from the wall of the container against an urging force of the urging member when pressure is applied through the first flexible member to the liquid existing a predetermined amount or more in the first reservoir chamber.

The second reservoir chamber contracts to cause the second flexible member to move the movable member in contact with the wall of the container by the urging force of the urging member when the pressure applied through the first flexible member to liquid existing in the first reservoir chamber is released.

The second reservoir chamber gradually contracts depending on consumption of the liquid by the liquid consuming apparatus when the pressure is applied through the first flexible member to the liquid existing the predetermined amount or less in the first reservoir chamber.

The operations (expansion and contraction) of the first and second reservoir chambers in conjunction with the pressure application to and pressure release from the liquid existing in the first reservoir chamber and depending on the consumption of liquid as well as the associated structures to enable the operations are also discussed in detail in US 2004-0252146-A1, the disclosure of which is incorporated herein by reference in its entirety.

The liquid container preferably includes a sealed space (such as a pressure application region 4), which is located within the container body, which is sealed from the second reservoir chamber and which faces the first reservoir chamber. The liquid container preferably includes a pressurized fluid introduction port which is formed in the container body and which is in fluid communication with the sealed space. Pressurized fluid can be introduced into the sealed space through the pressurized fluid introduction port to apply the pressure through the first flexible member to the liquid existing in the first reservoir chamber. As discussed in US 2004-0252146-A1, the pressure application to the interior of the first reservoir chamber and/or the pressure release therefrom can be realized by other ways without using this arrangement.

The first and second flexible members may be formed by a single film member.

In an illustrative, none-limiting embodiment as shown, for example, in FIG. 4, the cavity is partly formed using a through hole (41a) of a fitting member (41) provided in the piezoelectric sensing means (40). However, the present invention should not be restricted thereto or thereby. For example, without the use of the fitting member (41), a vibration plate (42) may be directly attached to the wall of the container to define the cavity using a recess portion or through hole (39,39'). That is, the cavity is defined by a through hole (39') formed through the wall of the container and a vibration plate (42) of the piezoelectric sensor in such a manner that one open end of the through hole is closed by the vibration plate and the other open end of the through hole is opened to the second reservoir chamber when the movable member is disposed away from the wall of the container and is closed by the movable member when the movable member is in contact with the wall of the container.

The liquid container preferably includes first and second flow passages for fluid communication between the second reservoir chamber and the cavity. The first and second flow passages may be formed by the wall of the container, or a part of the piezoelectric sensor, or by both the wall of the container and the part of the piezoelectric sensor. The various arrangements of the first and second flow passages for fluid communication between the second reservoir chamber and the cavity are discussed in detail in US 2005-0243110-A1, the disclosure of which is incorporated herein by reference in its entirety. As discussed above, in US 2005-0243110-A1, the most of the embodiments are directed to the piezoelectric sensor arranged such that the cavity of the piezoelectric sensor is in fluid communication with an upstream side liquid chamber through a flow passage and with a downstream side liquid chamber through another flow passage. In case the flow passage arrangements discussed in US 2005-0243110-A1 is employed in the present invention, the piezoelectric sensor and/or the container body is arranged such that the cavity of the piezoelectric sensor is in fluid communication with the same second reservoir chamber through those flow passages.

In an illustrative, none-limiting embodiment as shown in FIGS. 8A, 8B and 8C, the outer periphery of the movable member (34') is separated from an inner vertical wall surface of the container body in contrast to another illustrative, none-limiting embodiment as shown, for example, in FIG. 7A. Therefore, even when the movable member (34') is in contact with the bottom wall of the container body, the first flow path (9) is kept in fluid communication with the second flow path (9') through a gap around the outer periphery of the movable member.

Preferably, the second flexible member (such as an expandable member 55) is of a laminated structure including a heat-weldable layer and an air-impermeable layer, the container body includes a case member including a recess, the heat-weldable layer of the second flexible member is heat-welded to an open end (such as an opening surface 33a) of the recess so that the second reservoir chamber is defined by the second flexible member and the recess. Further, the movable member is heat-welded to the heat-weldable layer and is located within the second liquid reservoir chamber. That is, in an illustrative, none-limiting example as shown in FIGS. 8A, 8B and 8C, it is preferable that the flexible film (55) having the laminated structure is arranged to locate the heat-weldable layer of the flexible film (55) in a vertically downward, i.e. (in the interior side of the second reservoir chamber), and that the opening surface (33a) and the movable member (34') are heat-welded to the heat-weldable layer.

What is claimed is:

1. A liquid detecting device, comprising:
   a detection chamber, a part of which is defined by a film;
   a movable member supported by the film and being movable within the detection chamber in accordance with an amount of liquid stored in the detection chamber; and
   a detector disposed in the detection chamber and comprising:
      a cavity opposing the movable member;
      a plate member defining a bottom of the cavity; and
      a piezoelectric element disposed on the plate member and operable to vibrate the plate member.

2. The liquid detecting device as set forth in claim 1, further comprising:
   an urging member urging the movable member toward the detector.

3. The liquid detecting device as set forth in claim 1, further comprising:
   a first passage configured to allow liquid to flow from the detection chamber to the cavity; and
   a second passage configured to allow liquid to flow from the cavity to the detection chamber.

4. The liquid detecting device as set forth in claim 1, further comprising:
   a first passage configured to allow liquid to flow into the detection chamber; and
   a second passage configured to allow liquid to flow out of the detection chamber.

5. A liquid container, comprising:
   a detection chamber, a part of which is defined by a film;
   a movable member supported by the film and being movable within the detection chamber in accordance with an amount of liquid stored in the detection chamber;
   a detector disposed in the detection chamber and comprising:
      a cavity opposing the movable member;
      a plate member defining a bottom of the cavity; and
      a piezoelectric element disposed on the plate member and operable to vibrate the plate member;
   a storage storing liquid and communicating with the detection chamber; and
   an outlet communicating with the detection chamber and configured to discharge liquid therefrom.

6. The liquid container as set forth in claim 5, further comprising:
   an inlet configured to introduce pressurized fluid therefrom;
   an airtight chamber communicating with the inlet; and
   an elastic member defining a part of the storage and a part of the airtight chamber.

* * * * *